April 9, 1963     F. E. SCHEIDLER     3,084,675
HYDRAULIC COMPUTER SYSTEM
Filed Feb. 15, 1962
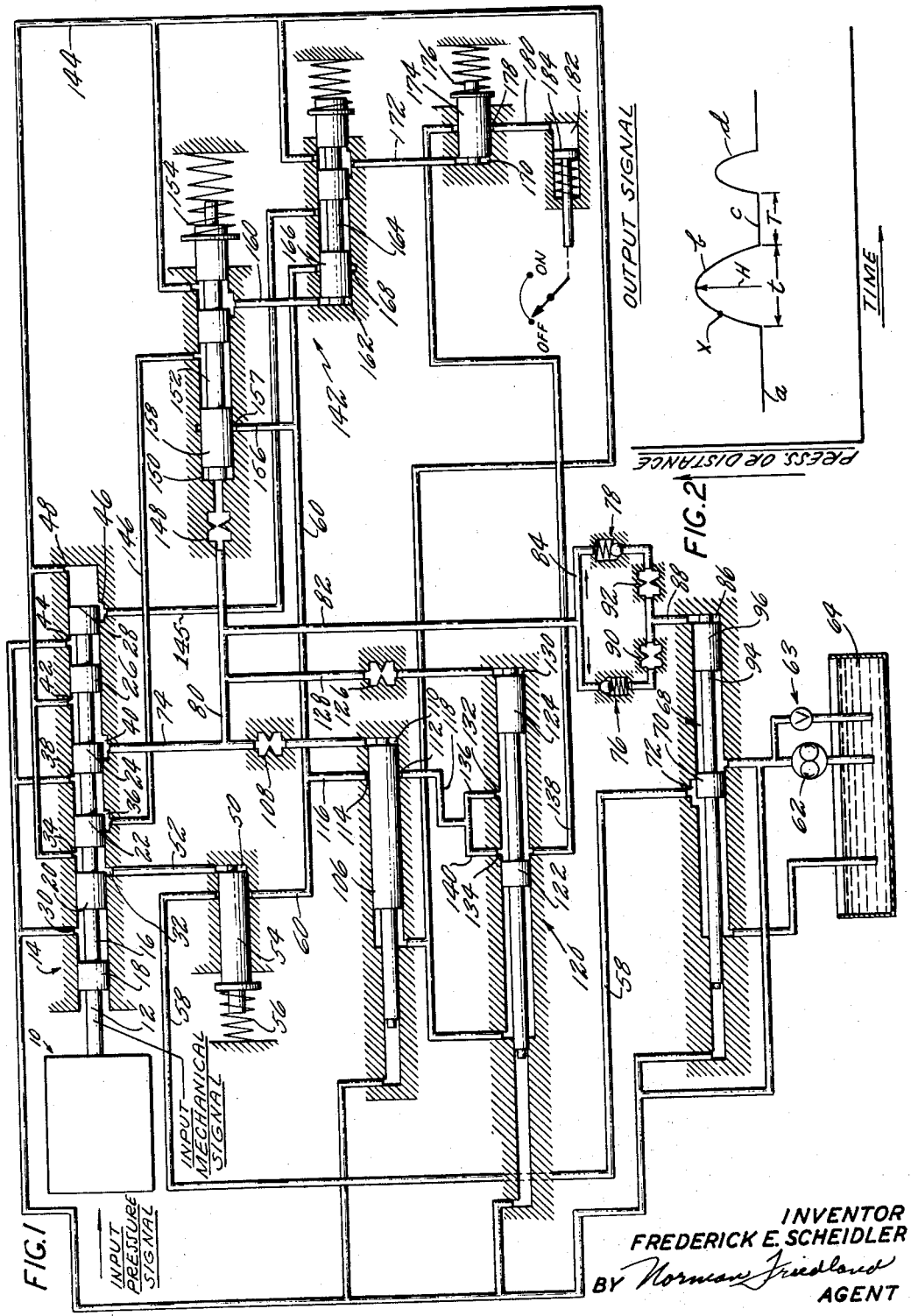
INVENTOR
FREDERICK E. SCHEIDLER
BY Norman Friedland
AGENT 3,084,675
HYDRAULIC COMPUTER SYSTEM
Frederick E. Scheidler, West Hartford, Conn., assignor to United Aircraft Corporation, East Hartford, Conn., a corporation of Delaware
Filed Feb. 15, 1962, Ser. No. 173,586
15 Claims. (Cl. 121—38)

This invention relates to a hydraulic computing system, and particularly to a system which is capable of producing an output signal when a predetermined characteristic or characteristics of an input signal or signals have been achieved.

My invention has particular application where a source of pressurized fluid is available, and it is desirable to produce an actuating signal when a predetermined condition has been reached. For example, in an air induction control designed to position the shock wave for optimum performance of aircraft, certain instability characteristics of control input parameters indicate hazardous operating conditions. It is important that only if these conditions are present corrective action is initiated automatically. In other words, actuation should only occur when there is certainty of the input signal. So that it is a feature of this invention to actuate a servo device or switch whenever a predetermined condition of an input signal or signals are prevalent. Thus, for example, it may be desirable to only actuate the servo or switch whenever the amplitude of an input signal has reached a certain value, the time of a pulse reaches a predetermined value, a predetermined member of pulses are evidenced and the time interval between pulses has reached a predetermined amount.

Thus, it still is another feature of this invention to provide in the system as described a computing device which is capable of measuring certain conditions of an input signal, and to store these conditions until such time as the overall requirement is obtained or until such time that one of the conditions has not been met.

Other features and advantages will be apparent from the specification and claims and from the accompanying drawings which illustrate an embodiment of the invention.

FIGURE 1 is a schematic illustration of this invention.

FIGURE 2 is a graphic illustration of the conditions which the present invention computes.

By way of showing this invention in its preferred embodiment, but in no way limiting it thereto, FIGURE 2 graphically illustrates the conditions which must be met before the device is capable of producing an output signal. It is to be understood that the output signal may be utilized for any number of purposes as would be obvious to one skilled in the art. FIGURE 2 is the plot of pressure or distance versus time while line $a$ represents steady state condition, curve $b$ represents the first pulse of the input signal, line $c$ shows steady state between pulses and curve $d$ represents a second pulse. T represents the time interval between pulses, $t$ represents the duration of a pulse, P represents the steady state pressure level, and H represents the amplitude. Now referring to FIGURE 1, a sensing device is generally indicated by numeral 10 which serves to transduce a pressure signal to a motion signal. The transducer is shown by way of illustration to convert the pressure signal to a pulsating motion signal. The motion is transmitted to pilot valve generally indicated by numeral 14 which contains spool 16 having lands 18, 20, 22, 24, 26 and 28. The valve contains a plurality of ports 30, 32, 34, 36, 38, 40, 42, 44, 46 and 48.

The following discussion is based on the assumption that a suitable pressure regulating system generally indicated by numeral 63 be employed which serves to maintain the high pressure supply at a preselected constant value above drain pressure.

For purposes of illustrating this invention, assume that the sensor 10 has picked up a signal having an amplitude greater than point X shown in FIGURE 2. When this occurs, spool 16 will translate to the right so that land 20 will uncover port 32 allowing high pressure to communicate with chamber 50 via line 52. This pressure acts on the end of valve 54 opposing spring 56 acting on its opposite end so that the force of the fluid acting on the right end of valve 54 will urge the valve to the left when this value is greater than the force of the spring. The length of land 20 is selected to allow high pressure to act on valve 54 when a predetermined amplitude condition has been met. This condition is the attainment of a specific minimum value or the ratio of the amplitude H to the steady state pressure level P. Thus valve 54 shifts in this predetermined position only when a predetermined amplitude characteristic of the input signal has been obtained.

As will be noted from FIGURE 1, high pressure fluid will only be conducted through line 58 when the following conditions are present:

(1) Pump 62 is actuated so as to deliver fluid reservoir 64 to valve generally indicated by numeral 68; and (2) When land 70 of valve 68 shifts to the left to uncover annulus 72 which will be described immediately hereinbelow.

Valve 68 is of the multiple area type having high pressure acting on the small end and metered pressure acting on the larger end. Assuming that the area of either end is half that of the other, then the pressure acting on the far right end (the larger end in this instance) must be half the pressure acting on the left end before the valve will translate. As mentioned above, the valve spool responding to the input signal has moved to the right to uncover port 32, simultaneously port 40 will be uncovered by land 24 so that high pressure issuing from port 48 will be conducted to line 74. This fluid is directed to a pair of check valves indicated by numerals 76 and 78, through branch lines 80, 82 and 84. It will be noted that each of the check valves comprises a spring and ball arrangement oppositely disposed so that when fluid is ingressing into chamber 86 via line 88, the pressurized fluid will be conducted through check valve 76 and when it is egressed from chamber 86, it will be conducted through check valve 78. To assure that the time between pulses T has reached a predetermined value, say, the time interval is greater than zero but less than four times the time of amplitude $b$, $t$ a pair of restrictions are interposed between the check valves 76 and 78 and valve 68. The area of restriction 90 is made four times larger than 92 in this example so that the fluid flowing toward valve 68 will be four times faster than the fluid flowing away therefrom. Spool 94 is designed so that the distance between lands 70 and 96 is such that when the amplitude $b$ is sensed by pilot valve 14, fluid communicated to chamber 86 causes spool 94 to move to the left at a constant rate determined by restriction 90 as long as amplitude $b$ exists. When the amplitude subsides to level $c$, spool 16 of valve 14 will have moved to the left for connecting chamber 86 to drain pressure via lines 88, restriction 92, check valve 78, branch lines 82, 80 and 74, port 40 as presently viewed in the drawing. Since restriction 92 is four times smaller than restriction 90, the velocity of spool 94 will be impeded so as to take spool valve 94 four times longer to move to the right to abut against the extreme right end. If it does this, then it will be appreciated that land 70 will cover port 72 so that no flow will be conducted to line 58 and hence this condition is not satisfied. However, assume that this characteristic has been satisfied, that is, the time interval is less than four times the time of the amplitude signal and greater than zero. Before the spool valve 94 has time to reach the far right end, the second pulse causes the spool valve 16 to again move to the right end and thus directing high pressure to chamber 86, as described above, thus preventing land 70 from returning to the extreme right position and hence allowing uninterrupted communication between pump 62 and line 58. Thus far, what has been shown is means for measuring two characteristics or conditions of the input signal so that high pressure fluid from pump 62 is conducted through valves 68 and 54 to valve 106.

Valve 106 which will be immediately described hereinbelow serves to measure the time or duration of amplitude signal $b$, i.e., $t$ is greater than a predetermined value, say .14 second. As mentioned above, when sensor 10 transmitted the signal to the spool valve 16, high pressure was conducted to valves 54 and 68. Likewise and simultaneously therewith, high pressure fluid is conducted to restriction 108 and subsequently to chamber 110 of valve 106. Valve 106 is of the multiple area type having high pressure acting on one end and metered pressure acting on the other end. In this example, the piston is of the half area type. High pressure acts on the smaller end and metered pressure acts on the larger end so that for equilibrium metered pressure must be equal to one half the pressure on the opposite end. As will be obvious to those skilled in the art, a constant pressure drop across restriction 108 will be maintained while valve 106 is translating so that the flow is proportional to the area of the orifice to achieve the proper value of $t$. Since the velocity is controlled, it is only necessary to design valve 106 to have the proper displacement so as to uncover ports 112 and 114 at a predetermined time, i.e., the predetermined .14 second value. So in the condition as set forth, fluid is conducted from line 60 and branch line 116 to line 118, valve 106 must move to the left of port 112.

In the preferred embodiment, it is an additional condition that the time $t$ of the duration of the amplitude signal $b$ does not exceed say, for example, two seconds. This is accomplished by the valve generally indicated by numeral 120 which comprises a pair of lands 122 and 124. The restriction 126 acting in a similar manner as restriction 108 is fed with pressurized fluid through line 128 which is ultimately conducted to chamber 130. This serves to translate valve 120 to the left, when the pressure in chamber 130 reaches half the value of the opposing pressure.

The amount of the displacement of valve 120 is dictated by the value selected for $t$. In this instance, since the value of $t$ should be less than two seconds, the displacement is such that if the duration of amplitude $b$ is greater than two seconds, land 124 will be positioned between ports 132 and 134 so that fluid issuing from line 136 will go behind land 124 to hold the valve. In this position, the land prevents fluid from flowing into line 138 so that no output signal will be evidenced, hence the condition is not satisfied. On the other hand, if the value of $t$ is less than two seconds then the extent of travel of valve 120 will be such that the left-hand end of spool 124 will not have passed port 132 at the time valve 14 returns to position $c$. Land 24 will port drain pressure to chamber 130 causing valve 120 to return to the right which allows the signal fluid to be conducted from port 134 to line 138. Therefore, another characteristic of the input signal has been computed by this device.

As mentioned earlier, it was also desirable to produce an output signal when more than one pulse has been evidenced by the input sensor. This is obtained by the pulse sensing mechanism indicated generally by numeral 142. As noted above, when the first amplitude was initially sensed by the pilot valve 14 the spool was moved to the right. Land 28 in this position moves to the right of port 46 to conduct high pressure to line 145. Lands 22 and 24 also shifted to the right for communicating drain pressure of line 34 with line 144 while high pressure issuing from port 38 was conducted to port 40 and directed through line 80 to restriction 148 and then into chamber 150. This high pressure acting on valve 152 urges the valve to the right against the force of spring 154. High pressure evidenced in line 60 conducted to valve 152 through branch line 156, for hydraulically latching the valve as follows. When the pressure acting on the left end of land 158 causes valve 152 to move to the right, it passes over port 157 and the edge cooperates with this port so that so long as high pressure is discharging from the port, the valve is unable to move back. It is apparent from the foregoing that valve 152 and the computer has sensed and stored this signal so long as other conditions are satisfied. Valve 164 serves to sense whether or not a second pulse is received by the following.

As noted above, before the input sensor receives the first amplitude signal, the line 146 receives high pressure until the amplitude is sensed and then line 146 communicates with drain pressure through ports 34 and 36, since the valve spool 16 and hence land 22 has moved to the right. When the first pulse has subsided, the valve will return to the left position as is shown in the drawings, and communicate high pressure from port 38 to port 36 and hence into line 146. Since in the previous cycle the valve 152 has moved to the right and opened up line 146 to line 160, high pressure will now be conducted to chamber 162 for positioning valve spool 164 to the right against the force of spring 166. When this occurs, high pressure fluid issuing from line 60 will latch valve spool 164 to hold the land 166 just beyond the port 168. It will be noted that during this condition line 144 is conducting to drain via port 46 and 48. When the second pulse is received by the pilot valve, the valve spool will again shift to the right to communicate high pressure fluid issuing from port 44 to port 46. This serves to conduct high pressure fluid through line 144 and into chamber 170 via line 172. When this occurs, valve 174 shifts to the right against the force of spring 176 to uncover port 178 so as to allow high pressure fluid issuing from line 138 to line 180. This pressurized fluid is directed to chamber 182 to act on piston 184. The piston is then shifted in response to the input signal that is governed by the computer device. The existence of this output signal is a positive indication that all the predetermined characteristics of the input signal are satisfied.

In summary the output signal will occur in the illustrated example only when:

(1) Amplitude value $x$ (computed by valve 54) is reached.

(2) $t$ is greater than .14 second (computed by valve 106).

(3) $t$ is less than 2 seconds (computed by valve 120).

(4) T is greater than 0 but less than 4 times $t$ (computed by valve 68).

(5) Two consecutive pulses are sensed (computed by 142).

It will be appreciated that the computing system will be reset to its original position (the position shown in the drawing) when the predetermined conditions are not satisfied. Thus, for example, if T is greater than 4 times $t$ valve 94 will move to cut off the supply of fluid pressure to the other valves so that the signal sensed by these valves will be wiped out and the valves will be returned to calculate a new set of conditions of the input signal.

Thus, what has been shown by this invention is a device having a plurality of valves hydraulically or pneumatically actuated for computing the characteristics of an input signal or signals for controlling an output device when a predetermined composite of these characteristics have been calculated.

It is to be understood that the invention is not limited to the specific embodiment herein illustrated and described, but may be used in other ways without departing from its spirit as defined by the following.

I claim:

1. A hydraulic computer device for generating an output signal when predetermined conditions of an input signal have been achieved comprising (a) a plurality of computing valves arranged in series relation, (b) a source of pressurized fluid,
(c) an input control valve for regulating the flow of fluid to each of said computing valves for calculating the conditions of the input signal,
(d) an output receiving member including fluid passage means connected to said source and to each of said computing valves, said output member receiving fluid from said source when the predetermined conditions of said computing valves have been achieved.

2. A hydraulic computing device for producing a resultant signal upon the occurrence of a plurality of predetermined events,
(a) means for sensing a characteristic of one event and producing a first signal,
(b) means for sensing the duration of said event to produce a second signal,
(c) means responsive to the occurrence of a second event for producing a third signal,
(d) means for sensing the interval between events to produce a fourth signal,
(e) means responsive to at least one of said signals for modifying the effect of one of the other of said signals,
(f) and means responsive to a preselected value of said signals for producing said resultant signal.

3. A hydraulic computing device for producing a final signal in response to a preselected occurrence of a plurality of signals,
(a) first valve means responsive to the intensity of a first signal,
(b) second valve means responsive to the duration of said one signal,
(c) third valve means responsive to the occurrence of a second signal irrespective of its intensity,
(d) fourth valve means responsive to the time interval between said one signal and said second signal,
(e) a final signal generator receiving a controlling signal from at least one of said means,
(f) and receiver means operative only upon the occurrence of said first and second signals for conducting said controlling signal to said generator.

4. A hydraulic computing system for measuring a plurality of characteristics of an input signal or signals comprising,
(a) a source of pressurized fluid,
(b) a pilot valve having a spool member for metering the pressurized fluid from said source in accordance with said input signal or signals,
(c) a plurality of serially arranged computing valve means,
(d) a plurality of fluid passage means in parallel relation connecting said computing valve means to said spool valve,
(e) an output member,
(f) conduit means bypassing said spool member and connecting each of said computing valve means with said source and said output member,
(g) said output member responding to said input signal or signals when each of said computing valve means reaches a predetermined condition.

5. A hydraulic computing system as defined in claim 4 wherein one of said computing valve means responds to the amplitude of said input signal or signals.

6. Mechanism as defined in claim 5 comprising a movable member movable to an open and closed position, a spring acting on one end of said movable member, the other end of said member subjected to the fluid conducted from one of said passage means for opening said valve member when a predetermined amplitude of the input signal is achieved.

7. A hydraulic computing system as defined in claim 4 wherein one of said computing valve means responds to the time duration of a pulse of said input signal or signals.

8. Mechanism as defined in claim 7 comprising a movable member movable to an open and closed position having different areas at either end, the smaller end continuously subjected to pressurized fluid for closing said movable member, a restriction in one of said passage means located upstream of the larger end, said movable member positioned to open when the rate of flow of the fluid passing through said restriction is above a predetermined value.

9. A hydraulic computing system as defined in claim 4 wherein one of said computing valve means responds to the number of consecutive pulses of said input signal or signals.

10. Mechanism as defined in claim 9 wherein said one computing valve means comprises first, second and third movable members, said first member connected to said conduit means, said first member controlled by said second member and said second member controlled by said third member, said first member responding to said second member solely when said second member is actuated by said third member.

11. Mechanism as defined in claim 10 including a first passage connecting said second member to said first movable member, one end of said first movable member subjected to fluid in said passage, a spring acting on the other end of said first movable member, said first movable member positioned to conduct fluid to said output member when the force of the fluid acting on said one end is greater than the force of said spring.

12. A hydraulic computing system as defined in claim 4 wherein one of said computing valve means responds to the time interval between consecutive pulses of said pilot valve.

13. Mechanism as defined in claim 12 including a spool valve, a ported housing encasing said spool valve, a land formed on said spool valve having one end subjected to the fluid in one of said fluid passage means, a pair of fluid lines in parallel relation connecting said one end to said pilot valve, restrictions disposed in each of said lines, a corresponding number of check valves located upstream of said restrictions and disposed in said fluid lines, said valves controlling the inlet and outlet of said fluid acting on said one end, and said spool valve responding to the rate of flow of the fluid passing through said restriction.

14. A hydraulic computing system as defined in claim 4 wherein one of said computing valve means responds to the time duration of said input signal for preventing passage of fluid from said source to said output member when said time goes beyond a predetermined value.

15. Mechanism as defined in claim 14 including a spool valve, a housing encasing said spool valve having a pair of spaced apart ports for receiving fluid conducted by said conduit means, one end of said spool valve continuously subjected to said pressurized fluid from said source and the opposite end subjected to metered fluid from said pilot valve, a land on said spool sufficiently elongated so as to span between said ports when the predetermined time value is obtained.

References Cited in the file of this patent

UNITED STATES PATENTS 2,782,769     Best  ---------------- Feb. 26, 1957